(12) United States Patent
Lyutsarev et al.

(10) Patent No.: US 12,476,735 B2
(45) Date of Patent: Nov. 18, 2025

(54) ERROR-RESISTANT DATA COMMUNICATION USING MULTIPLE CHANNELS

(71) Applicant: Microsoft Technology Licensing, LLC, Redmond, WA (US)

(72) Inventors: Vasily Lyutsarev, Cambridge (GB); Kai Shi, Cambridge (GB); Charles Boecker, Ames, IA (US); Daniel Jonathan Finchley Cletheroe, Cambridge (GB); Kaoutar Benyahya, Cambridge (GB); Junyi Liu, Cambridge (GB); Ariel Gomez Diaz, Cambridge (GB); Shawn Yohanes Siew, Cambridge (GB); Paolo Costa, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/639,489

(22) Filed: Apr. 18, 2024

(65) Prior Publication Data

US 2025/0330268 A1  Oct. 23, 2025

(51) Int. Cl.
*H04L 1/00* (2006.01)

(52) U.S. Cl.
CPC .......... *H04L 1/0057* (2013.01); *H04L 1/0071* (2013.01)

(58) Field of Classification Search
CPC ... H04L 1/0041; H04L 1/0045; H04L 1/0057; H04L 1/0071; H03M 13/27; H03M 13/275; H03M 13/2778
See application file for complete search history.

(56) References Cited

U.S. PATENT DOCUMENTS

| | | | |
|---|---|---|---|
| 8,495,475 B2 | 7/2013 | Kubo | |
| 2006/0218461 A1* | 9/2006 | Kyung | H03M 13/255 714/758 |
| 2013/0216221 A1 | 8/2013 | Zhang | |
| 2016/0028505 A1* | 1/2016 | Pi | G06F 11/1004 714/807 |

(Continued)

OTHER PUBLICATIONS

"Insight", accessed on link https://www.prysmian.com/en/insight/telecoms/nexst/space-division-multiplexing-sdm-enables-extremely-high-capacity-networks, 2024, 6 pages.

(Continued)

*Primary Examiner* — Shelly A Chase
(74) *Attorney, Agent, or Firm* — Weaver IP L.L.C.

(57) ABSTRACT

A transmission method comprising: encoding a message into error correction coding blocks, each comprising a different portion of the payload bits of the message and a respective plurality of error correction bits; and applying an interleaving map to error correction coding blocks, such that for each error correction coding block, different bits of the error correction coding block are mapped to different channels, each channel thus being used to transmit bits from a respective selection of multiple of the error correction coding blocks. Thus, for at least one channel failure scenario in which at least one of the plurality of channel fails leaving a plurality of remaining channels, enough bits will remain on the remaining channels to enable correction of the message based on the error correction coding.

20 Claims, 8 Drawing Sheets

(56) References Cited

U.S. PATENT DOCUMENTS

2023/0224104 A1* 7/2023 Rico Alvarino ...... H04L 1/1819 370/329

OTHER PUBLICATIONS

Chen, et al., "Integrated cladding-pumped multicore few-mode erbium-doped fibre amplifier for space-division-multiplexed communications", Nature Photonics, vol. 10, Jul. 11, 2016, pp. 529-533.
Ferreira, et al., "Overcoming degradation in spatial multiplexing systems with stochastic nonlinear impairments", Scientific Reports, Dec. 3, 2018, 10 pages.
John M. Cioffi., "Code Concatenation and Advanced Codes", Communication/Signal Processing: Data Transmission Theory, accessed on link https://cioffi-group.stanford.edu/doc/book/chap11.pdf, pp. 257-325, Jun. 10, 2025.
Jung, et al., "Chapter 7—Multicore and multimode optical amplifiers for space division multiplexing", accessed on link https://www.sciencedirect.com/science/article/abs/pii/B9780128165027000087, 2020, 3 pages.
Labroille, et al., "Characterization and applications of spatial mode multiplexers based on Multi-Plane Light Conversion", Optical Fiber Technology, vol. 35, 2016, pp. 93-99.
Molisch, et al., "Channel Coding and Information Theory", accessed on link https://ieeexplore.ieee.org/document/5635446, 2011.
Muhammed, et al., "Investigating the Effect of Different Channel Coding on the Performance of Sparse Code Multiple Access over AWGN Channel", Wireless Personal Communications, accessed on link https://link.springer.com/article/10.1007/s11277-023-10688-7, Aug. 8, 2023, 21 pages.
Murshid, et al., "Chapter 2 Fundamentals of multiplexing in optical fibers", accessed on link https://iopscience.iop.org/book/mono/978-1-68174-569-5/chapter/bk978-1-68174-569-5ch2, 2018, 18 Pages.
Riesen, et al., "Monolithic mode-selective few-mode multicore fiber multiplexers", Scientific Reports, Aug. 1, 2017, 9 pages.
Stuber, Gordon., "Error Control Coding", Principles of Mobile Communication, Second Edition, Jun. 1, 2017, pp. 391-456.
Swaminathan R, et al., "Classification of Error Correcting Codes and Estimation of Interleaver Parameters in a Noisy Transmission Environment", IEEE, vol. 63, 2017, 16 pages.
Wang, et al., "Study of Multiplexing for Group-based Quality of Service Delivery", Published by Chapman and Hall, accessed on link: https://link.springer.com/content/pdf/10.1007/978-0-387-35185-8_19.pdf, 1997, pp. 360-379.
Weng, et al., "Advanced Spatial-Division Multiplexed Measurement Systems Propositions—From Telecommunication to Sensing Applications: A Review", Sensors, 2016, 35 pages.
Extended European Search Report Received in European Patent Application No. 25171306.1 mailed on Sep. 5, 2025, 09 pages.

\* cited by examiner

ERROR-RESISTANT DATA COMMUNICATION USING MULTIPLE CHANNELS

BACKGROUND

The data communicated between two devices can be transferred through multiple channels. There are failures that can happen during the operation of such data transmission channels. These failures may include intermittent or persistent high bit-error-rate (BER) channels, as well as fully broken channels. Due to different physical implementations, channels can have various failure rates over their production lifetime.

Without a reliability scheme for data transmission channels, the data communication will not be able to saturate its designed bandwidth or will require the replacement of the data transmission system in production. These cases will adversely affect the networking performance between the connected devices. A well-designed reliability scheme is desirable in order to enable reliable and fault-tolerant data communication.

An example usage scenario may be found in optical communication fiber cables, such as those used in data centers. These cables connect server networking interface cards and switches. Other usage scenarios may include parallel bus interfaces for DRAM, PCIe, chip-to-chip and die-to-die.

SUMMARY

According to one aspect disclosed herein, there is provided a method of transmission, the method comprising: obtaining a message comprising multiple payload bits; encoding the message into a plurality of error correction coding blocks, each error correction coding block comprising a respective block of input bits, each block of input bits comprising a different respective portion of the payload bits of the message and a respective plurality of error correction bits; applying an interleaving map to the plurality of error correction coding blocks to interleave the inputs bits of the blocks across a plurality of channel groups; and transmitting each of the channel groups 1 via respective channel. The interleaving map results in, for each error correction coding block, each of the input bits of the error correction coding block being mapped to a respective channel group to be transmitted on a respective channel for the respective channel group from among a plurality of channels, the respective channels being different than one another, wherein for each error correction coding block at least some of the input bits of the error correction coding block are mapped to different ones of the channel groups than one another. Each channel group thus comprises interleaved bits from a respective selection of multiple of the error correction coding blocks, such that for at least one channel failure scenario in which at least one of the plurality of channel fails leaving a plurality of remaining channels, enough bits will remain on the remaining channels to enable correction of the message (based on the error correction coding which can correct up to E bits per block, where $E \geq 1$ and depends on the coding used).

Thus according to the disclosed method, a payload message is encoded into encoding blocks, each comprising error correction code (ECC) bits that enable correcting up to E erroneous bits of the block (where $E \geq 1$ depending on the coding). The bits of the encoding blocks are then interleaved across different channels (e.g. different frequency channels of an optical fibre) in such a way that if any one channel fails, the message is still recoverable at the receiver. I.e. once the channel groups are de-interleaved at the receiver, no more than E bits are lost from any one given block. Thus in some or all possible failure scenarios, it is possible to recover (i.e. correct in event of error) all payload data at the receive side even if one channel completely fails. The recovery condition may be stated as being that the message can be recovered in at least one failure scenario for at least one message size, e.g. a predetermined failure scenario for a predetermined message size or range of sizes. In embodiments the recovery condition may be that the message can be recovered in event of any of multiple failure scenarios, each comprising failure of a different channel or combination of channels. E.g. the recovery condition may be that the map enables recovery of a predetermined set of multiple failure scenarios for a predetermined message size or predetermined range of message sizes. The interleaving map may be determined analytically to meet the desired recovery condition, either manually or automatically, e.g. by the transmitter software or circuitry. Examples of analytical methods of determining the map will be discussed later. Alternatively the map may be determined by adaptively trialling different interleaving maps (e.g. randomly generated maps) at run-time, and selecting one of the trialled maps that is determined at run-time based on observation to meet the recovery condition (where the observation could be applied at the transmit or receive side). As another possibility, the map may be predetermined empirically prior to runtime (e.g. at the design stage), for example based on manual or automated trial-and-error to find a map which meets the desired recovery condition.

In embodiments, at least some of the plurality of channels may be implemented on different transmission frequencies than one another, e.g. different optical transmission frequencies multiplexed through a same optical fiber. Alternatively or additionally, some or all of the plurality of channels may be implemented on different physical transmission paths than one another, e.g. different optical fibers.

In embodiments, the method may comprise: detecting a problem channel from among the plurality of channels, wherein the problem channel is either a failed channel or a channel having a bit error rate detected to exceed a threshold; and in response to the detecting of the problem channel, switching the channel group of the problem channel to being transmitted over a back-up channel, the back-up channel being an additional channel in addition to said plurality of channels This may also be referred to as "hot swapping". Such embodiments advantageously provide the ability to adapt in the face of failed channels.

In embodiments, at least some of the plurality of channels may be implemented via different units of transmission hardware than one another, and in each of at least one of the units of transmission hardware, the unit of transmission hardware may implement multiple of the plurality of channels time-division multiplexed through the unit of transmission hardware. In such embodiments the method may comprise detecting one of the units of transmission hardware having a failed channel or a channel with an error rate below a threshold, and in response swapping said one of the units of transmission hardware with a back-up unit of transmission hardware.

Such embodiments advantageously reduce the amount of multiplexing circuitry needed (e.g. cross-bar multiplexing circuitry) in order to implement hot-swapping, and therefore reduce complexity in silicon (e.g. when the method, or at least the multiplexing across different channels, is implemented in circuitry on an integrated circuit such an ASIC).

According to further aspects disclosed herein, there are provided a corresponding program and a corresponding transmitter apparatus, configured to perform operations corresponding to any embodiment of the methods described herein. According to yet further aspects there are provided corresponding receive-side methods, programs and receiver apparatus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
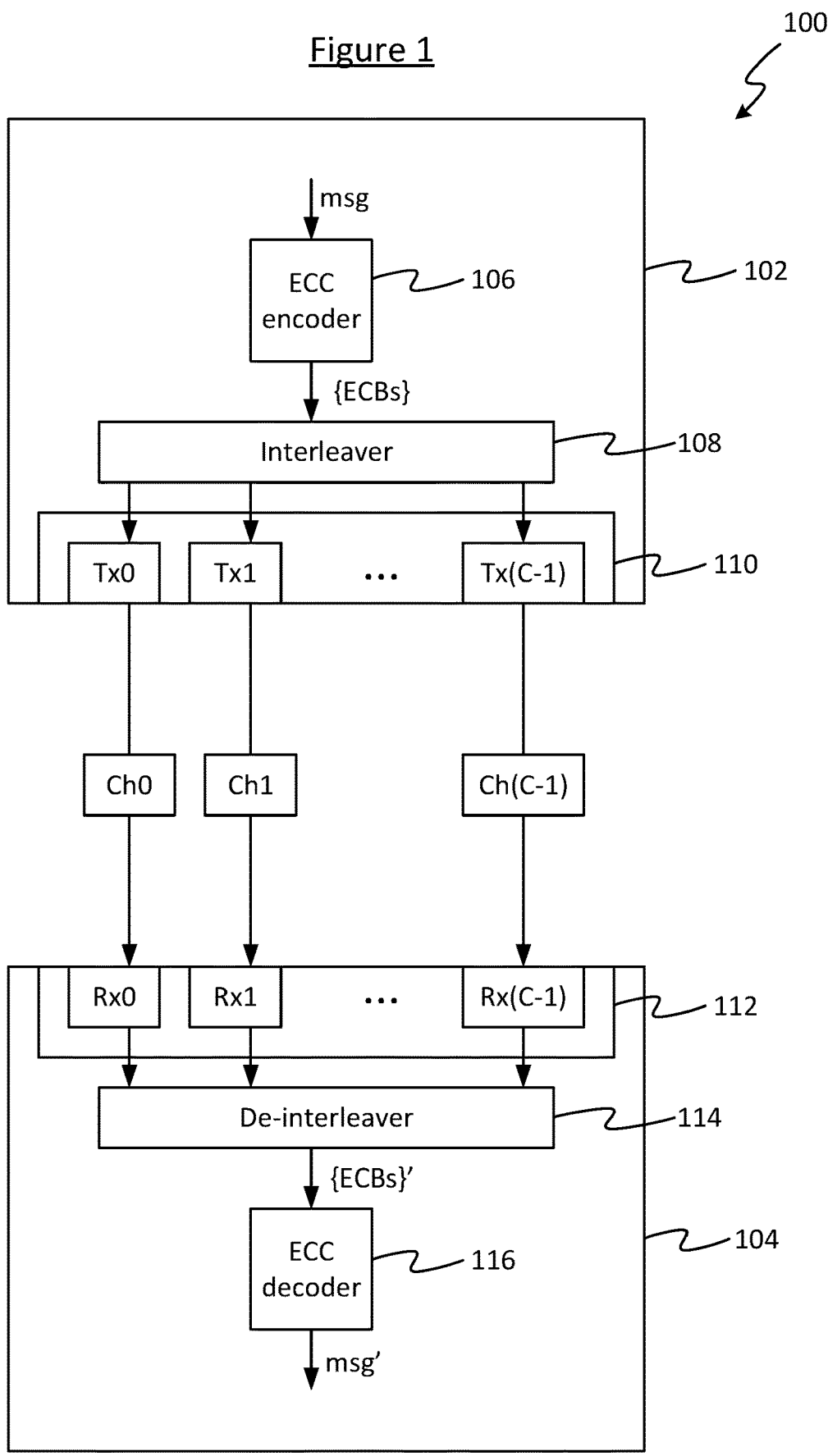
FIG. 1 is a schematic block diagram of a system comprising transmitter and receiver in accordance with embodiments disclosed herein.

As mentioned earlier, the data communicated between two devices can be transferred through multiple channels. There are failures that can happen during the operation of these data transmission channels. Such failures include intermittent or persistent high bit-error-rate (BER) channels, and fully broken channels. Due to different physical implementations, channels can have various failure rates over their production lifetime. The data communication may be provided with extra channels to compensate the errors for high BER and failures on the transmission channels. This will involve a digital system on both connected devices to apply error detection, correction and repairment. Such a system may be implemented in an application-specific integrated circuit (ASIC) that drives the data transmission channels. Target usage scenarios include optical communication fiber cables, such as those used in data centers. These cables connects server networking interface cards and switches. Other usage scenarios include parallel bus interfaces for DRAM, PCIe, chip-to-chip and die-to-die.

It would be desirable to provide a well-designed reliability scheme in order to enable reliable and fault-tolerant data communication. It would also be preferable to implement such a scheme in an efficient manner. For example, it would be desirable to provide a scheme which reduces the impact on the ASIC area and power consumption while achieving a required communication reliability.

Embodiments disclosed herein combine traditional error correction codes (ECCs) with cross-channel data interleaving and backup-channel hot swapping. In order to make hot swapping a feasible on chip implementation for >100s channels, some embodiments provide a hot swapping mechanism that leverages both time scheduling and spatial multiplexing.

In a particular use case, the channels may be uLED-based communication channels in high-performance networking or chip-to-chip and die-to-die communication scenarios.

Embodiments may comprise two layers of error protection: 1) the combination of ECC and a data interleaving scheme, and optionally hot swapping; and further optionally, 2) a hot swapping mechanism realized by time scheduling and spatial multiplexing.

The first layer is to use error correction coding (ECC) across all data transmission channels. ECC can locate faulty channels and correct error bits coming from them. By counting the error bits detected, the system can also use ECC to measure the BER level of these channels. Alternatively, a dedicated test-signal pattern generator and detector may be used to measure BER between channel transmission and reception. When a channel's BER is close to a threshold, the second layer may use a hot-swapping system to replace a near-faulty channel with one of the backup channels at run time.

An advantage, which the disclosed techniques may be employed in order to achieve, is enabling high reliability with low cost of chip implementation. For example, in the target use case of optical fiber, this can allow a uLED-based many-channel cable to achieve an overall failure rate close to traditional copper cable. This can enable wide adoption of optical cables to replace thick copper cables. If the data center can reduce a lot of cabling space, its design can be greatly changed to achieve higher density of servers. Another benefit of using optical cables is longer cable reach than the copper cables.

ECC in itself is a known technology. Embodiments disclosed herein use ECC to correct errors in the foreground; such that ECC will keep the communication link alive when channel failure happens, while hot swapping can be done in the background with no impact to the live bandwidth.

This first layer involves finding and using specific cross-channel interleaving maps. Hamming codes may be used as ECCs, which correct a single error per coded data block. When using ECC with such interleaving, the map is preferably arranged such that any single channel failure will only cause a single error in any given one of the coded data blocks. Otherwise, it may not be possible to keep the link alive in the foreground. This feature can be extended to a more general case. Consider the use of an ECC algorithm that can correct E errors. If <=E channel failures happen, there are <=E errors in the coded data blocks.

For the second layer, embodiments use both spatial and time multiplexing to reduce the cost of crossbar multiplexers in ASIC implementation.

By way of example, the following is a summary of a sequence of steps which may be performed for the multiplex rerouting on the transmit side, according to example embodiments disclosed herein.

I. A failed channel is detected. According to its channel index x, one can know that it belongs to the group of channels connected to port y of the hot-swapping crossbar.
II. The crossbar will be programmed to connect port y to the available backup channel.
III. There are G channels grouped to send their data sequentially to the crossbar. The sending speed is G times faster than each channel's speed.
IV. One the other side of the crossbar, the selected backup channel will receive G pieces of data at each channel-clock cycle over the crossbar.
V. The data sending order is fixed and known within these G pieces of data. Embodiments can use simple filtering to only keep the data belonging to the failed channel X.
VI. The kept data from failed channel X will be sent through the backup channel.

As can be seen, if G is large, the crossbar has to be run at a high clock frequency, but the crossbar size can also be largely reduced. The choice of this factor value will depend on ASIC implementation trade-offs between max clock speed and area budget of hot-swapping crossbars.

The various disclosed concepts will now be described in more detail with reference to FIGS. 1 to 8.

FIG. 1 shows a system 100 comprising: a transmitter (transmitting apparatus) 102, and a receiver (receiving apparatus) 104. The apparatus of the transmitter 102 may be implemented in a single transmitting device or across more than one transmitting device. The apparatus of the receiver 104 may be implemented in a single receiving device or across more than one receiving device. Examples of devices which may be either transmitting or receiving devices include mobile phones, tablets, laptop computers, desktop computers and server units, or component devices thereof such as network cards, modems, etc.

The transmitter 102 is arranged to communicate with the receiver via a plurality C of channels Ch0, Ch1 . . . . Ch(C−1). Some or all of these channels employ distinct carrier means from one another. For example, in one embodiment all the channels are multiplexed over a single physical path but using separate carrier means in the form of different transmission frequencies, e.g. optical frequencies or radio frequencies in the case of electromagnetic signalling. For instance in a particular example use case, the different channels employ different frequencies of light (e.g. UV) multiplexed over the same optical fiber. Alternatively the channels may be implemented over different physical paths, such as via different parallel optical fibres (e.g. in a bundle). Or a combination of approaches may be used, such that different subgroups of channels are transmitted over different physical paths (e.g. different fibres), but within each subgroup the channels are implemented over different frequencies (e.g. different frequencies of light) multiplexed through the same physical path (e.g. same optical fiber). Or as another possibility, some (but not all) of the channels may be time-division multiplexed with respect to each other over the same physical path and frequency. This will be discussed in more detail later.

The transmitter 102 comprises an error correction code (ECC) encoder, an interleaver 108, and a transmission interface 110. The receiver 104 comprises a receiving interface 112, a de-interleaver 114, and an ECC decoder 116. The transmission interface 110 is arranged to transmit data over the plurality of channels Ch0 . . . . Ch(C−1) in accordance with the relevant transmission technology for each channel, examples of which are outlined above, e.g. optical fibre transmission over different frequencies and/or fibers. The receiving interface 112 is arranged to receive data over the plurality of channels in accordance with the complementary reception technology, e.g. to receive light signals via the optical fiber(s). The transmission interface 110 may comprise a respective instance Tx0 . . . . TX(C−1) of a unit of transmission circuitry (hardware) Tx for each of some or all of the different channels Ch0 . . . . Ch(C−1), each configured as appropriate for transmitting over the respective channel. For example in the case where some or all the channels Ch0 . . . . Ch(C−1) are multiplexed on different transmission frequencies over the same optical fiber, each unit of transmission circuitry Tx0 . . . . Tx(C−1) may comprise a light source such as a LED (e.g. uLED) and associated driver circuitry arranged to transmit over the relevant fibre on the respective optical frequency; and/or, in the case where some or all of the channels are implemented over different fibers, then an individual transmission unit Tx is arranged at the input of each fibre for each combination of fiber and frequency. In such embodiments, the receiving interface 112 may comprise a respective reception unit Rx0 . . . . Rx(C−1) for each reception unit Tx0 . . . . Tx(C−1), e.g. light sensor, arranged to receive data over the respective channel using the complementary reception technology.

Figure 2:
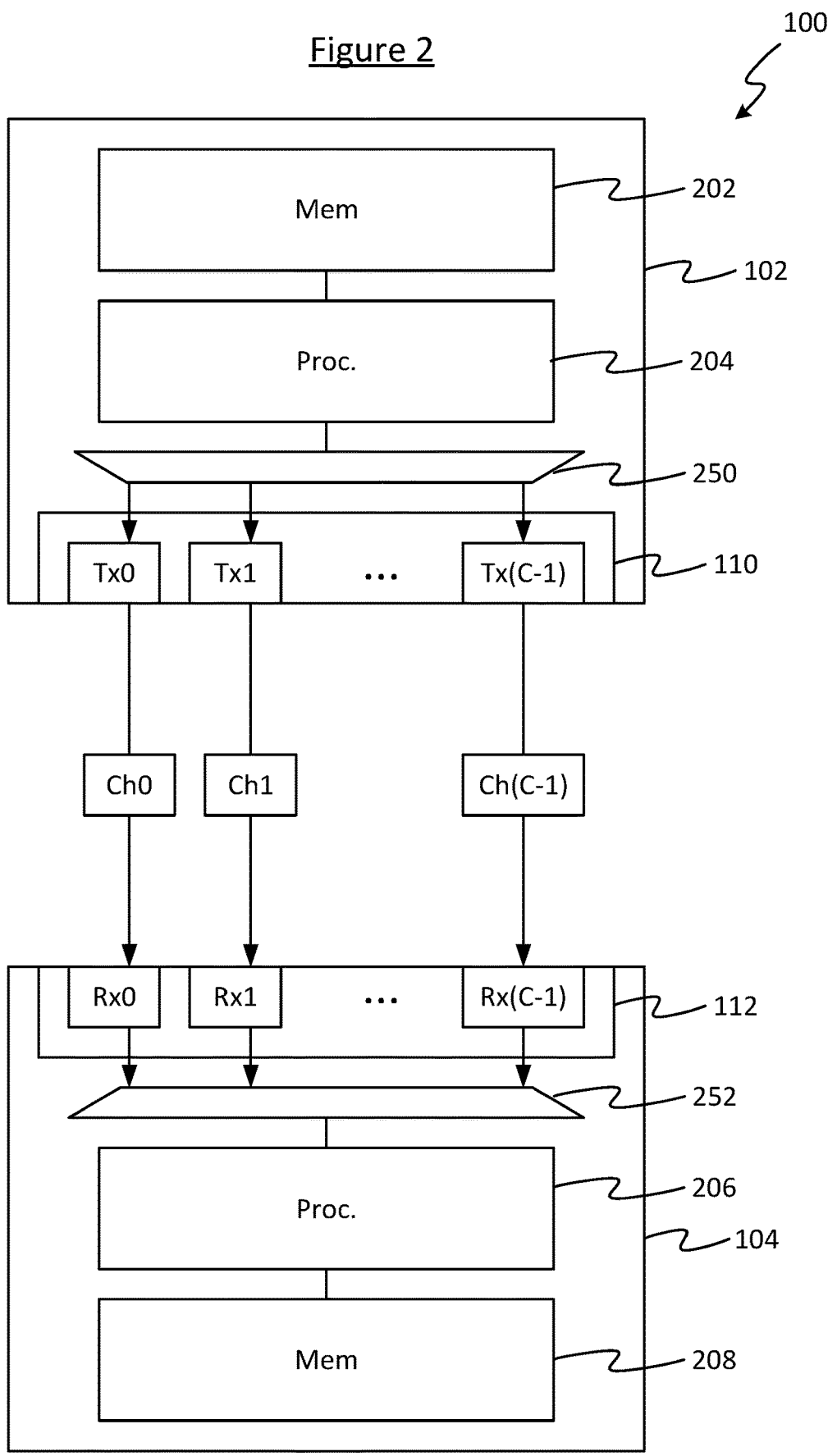
FIG. 2 is another schematic block diagram of a system comprising transmitter and receiver.

FIG. 2 shows an example implementation of the transmitter 102 and receiver 104. The transmitter 102 may comprise memory 202, processing apparatus 204 and multiplexing circuitry 250. The memory 102 comprises one or more memory devices such as a RAM, ROM or storage device; each of which may employ any of one or more suitable memory media, e.g. magnetic memory such as a magnetic hard drive, disk or tape, MRAM or magneto-optical memory, electronic memory such as SRAM, DRAM, EEPROM, flash memory or SSD technology, or optical memory such as an optical disk or quartz glass storage, or even more exotic forms such as synthetic biological memory. The processing apparatus 204 comprises one or more processors, each of which may take any suitable form, e.g. a general purpose processor such as a CPU (central processing unit), or an accelerator processor or dedicated purpose processor such as a digital signal processor (DSP) or repurposed GPU (graphics processing unit), AI accelerator or crypto processor.

The ECC encoder 106 may be implemented in software stored in the memory 202 of the transmitter 102 and arranged to run on the processing apparatus 204 of the transmitter, the software being configured so as when thus run to perform the described functionality of the ECC encoder 106. Alternatively it is not excluded that the ECC encoder 106 could be implemented in dedicated hardware circuitry, or configurable or reconfigurable circuitry such as a PGA (programmable gate array) or FPGA (field programmable gate array), or any combination of software and hardware.

The interleaver 108 may be implemented in the form of the multiplexing circuitry 250 (dedicated hardware)—e.g. cross-bar circuitry—or a combination of multiplexing circuitry and software which controls the multiplexing circuitry. In the latter case the relevant software is again stored in the memory 202 and arranged to run on the processing apparatus 204, in order to control the multiplexing circuitry 250 to perform the described functionality.

The transmission interface 110 comprises the front-end transmission hardware, e.g. LEDs and driver circuitry, but may optionally also include some higher level functions implemented in the software stored in the memory 202 and arranged to run on the processing apparatus 204.

The receiver 104 may comprise demultiplexing circuitry 252, processing apparatus 206 and memory 208. The processing apparatus 206 of the receiver 104 comprises one or more processors, each of which may take any suitable form, such as those listed by way of example in relation to the processing apparatus 204 of the transmitter 102. The memory 208 of the receiver 104 comprises one or more memory devices, each of which may employ any of one or more suitable memory media including any of those listed by way of example in relation to the memory 202 of the transmitter 102.

The receiving interface 112 comprises the front-end reception hardware, e.g. light sensors and associated sensing circuitry, but may optionally also include some higher level functions implemented in the software stored in the memory 208 of the receiver 104 and arranged to run on the processing apparatus 206 of the receiver 204.

The de-interleaver 114 may be implemented in the form of the de-multiplexing circuitry 252 (dedicated hardware)—e.g. cross-bar circuitry—or a combination of multiplexing circuitry and software which controls the de-multiplexing circuitry 252. In the latter case the relevant software is again stored in the memory 208 of the receiver 104 and arranged to run on its processing apparatus 206, in order to control the de-multiplexing circuitry 252 to perform the described functionality.

The ECC decoder 116 may be implemented in software stored in the memory 208 of the receiver 104 and arranged to run on the processing apparatus 206, the software being configured so as when thus turn to perform the described functionality of the ECC decoder 116. Alternatively it is not excluded that the ECC decoder 116 could be implemented in dedicated hardware circuitry, or configurable or reconfigurable circuitry such as a PGA (programmable gate array) or FPGA (field programmable gate array), or a combination of software and hardware.

Returning to the representation of FIG. 1, in operation the ECC encoder 106 receives a message (msg) which comprises data to be transmitted over the channels Ch. The message may be received from an application running on the processing apparatus 102, or from any other hardware or software component (not shown). The message could be practically any data that the application or designer wishes to send. The message comprises multiple payload bits, which are the bits of data content that are desired to be transmitted.

The ECC encoder 106 is configured to encode the message (msg) into a set {ECBs} of error correction blocks (ECBs), the set comprising multiple members (multiple different ECBs). The encoding is performed according to any suitable error correction coding (ECC) algorithm. Each error correction block (ECB) comprises a different respective portion of the payload bits of the message (msg) and a respective plurality of error correction bits. Each portion of payload bits comprises more than one but fewer than all of the payload bits of the message, and could also be called a subgroup of the payload bits of the message. Preferably the different error correction blocks comprise exclusive portions (exclusive subgroups) of the payload bits of the message, i.e. each error correction block comprises only its own bits, and no error correction block comprises any of the payload bits nor error correction bits of any other of the error correction blocks for a given input message.

The error correction bits of each block form a respective error correction code for the block, which enables the correction of one or more potential bit-errors in the respective block, e.g. if corrupted in transmission or storage, such that if up to that many bits from the block experience errors, the block can be corrected using the respective code (the respective error correction bits of the block). The number of error correction bits per block and the number of errors that can be corrected per block depends on the ECC algorithm used. Various types of error correction codes and the corresponding ECC algorithms for performing the corresponding encoding and decoding are, in themselves, well known in the art. For instance in one example, the ECCs are Hamming codes. E.g. in embodiments each code may comprise two error correction bits and is able to correct only one error per block.

Figure 3:
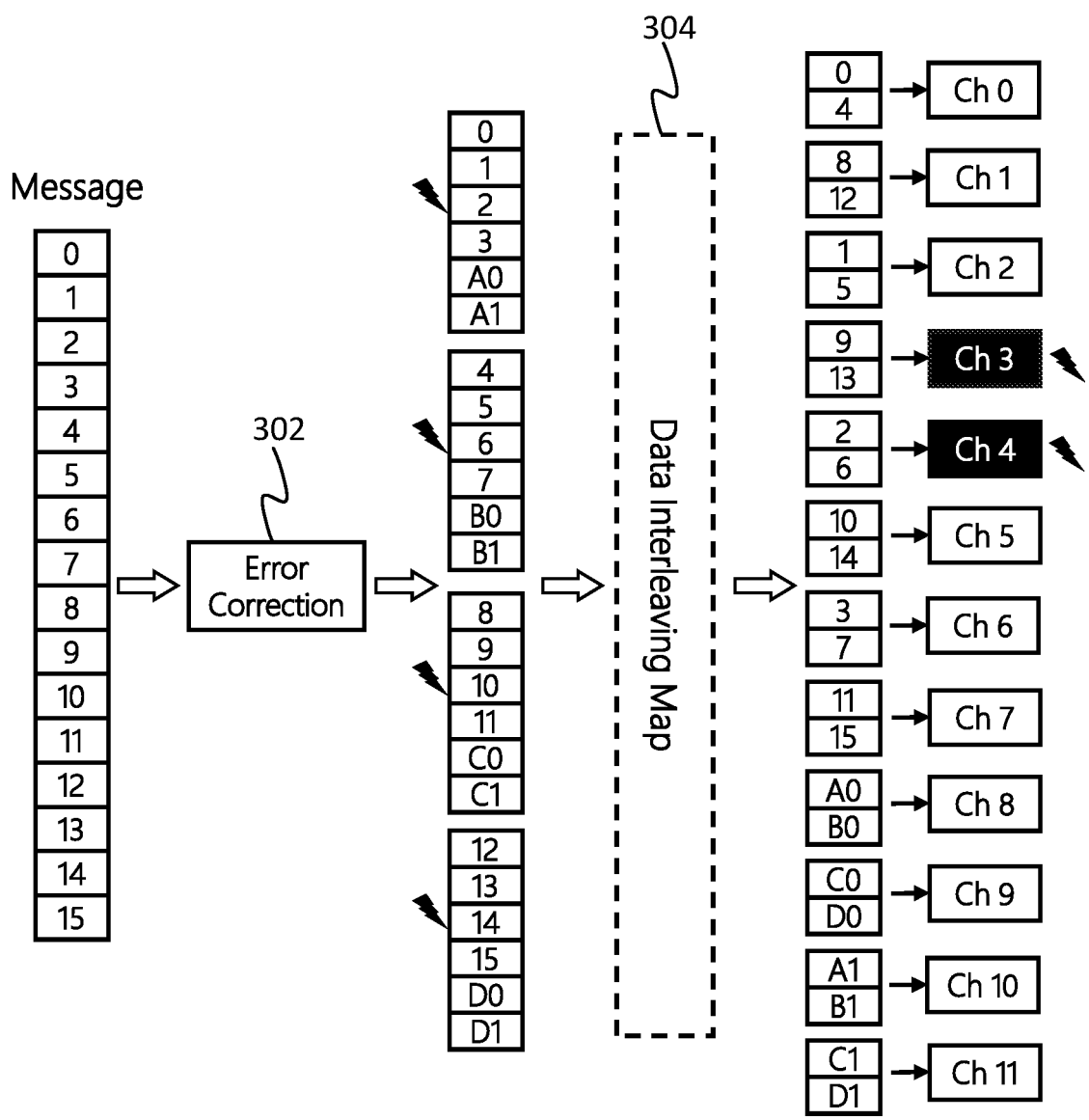
FIG. 3 illustrates an example method of using ECC with data interleaving to correct and locate error bits from failed data channels.

One such example is shown by way of illustration in FIG. 3, where an error correction encoding function 302 performed by the ECC encoder 106 encodes a 16-bit message into four 6-bit error encoding blocks, each consisting of a different, exclusive respective portion four payload bits from the message msg, and a respective error correction code of two error correction bits per block (labelled A0-A1 in the first block, B0-B1 in the second block, C0-C1 in the third block and D0-D1 in the fourth block). The error correction codes may be Hamming codes and in this example may be able to correct 1 bit-error per block.

More generally, an error correction block may comprise B bits per block, with D payload bits per block and an error correction code of B-D error correction bits per block, which may be able to correct up to a maximum of E errors per block, depending on the coding used.

Whatever error encoding algorithm is used, the encoding of the message into error correction blocks may be implemented using suitable machine logic steps, including: accessing an array of payload bits of the message held in a volatile or non-volatile storage e.g. addressable registers or memory addresses; transforming the accessed payload bits into the bits of the error correction encoding blocks using machine logic (e.g. software run on a processor, and/or dedicated hardware circuitry); and placing the resulting bits in a suitable array representing the set of error correction coding blocks {ECBs} in another location in a suitable volatile or non-volatile storage location.

The bits of the error correction coding blocks form a sequence a sequence input bits suitable to bet transmitted over one or more channels. One could simply transmit the error correction blocks all on the same channel, or transmit each error correction block or subset of blocks on a different respective channel Ch. However, channels can become lossy due to noise or interference, or even completely fail. For example, the individual transmit circuitry Tx_n or receive circuitry Rx_n may fail on one of the channels, or a particular one of the channels may be more susceptible to noise or interference on a given frequency. This would mean that if any individual channel drops out or has its bit error rate (BER) rise above E bits per block, then any block sent on the channel in question would not be recoverable (all the payload bits that it carries could not be completely corrected using the respective error correction code).

To address this and provide for the possibility of more reliable error correction, the interleaver 108 is arranged to apply an interleaving map to the plurality of error correction blocks. That is, the bits of the set of error correction blocks {ECBs} (including both the payload bits and the error correction bits) will be interleaved channel-wise (i.e. mixed) across a plurality of channel groups, such that for each error correction block, different bits of the error correction block are mapped to different channel groups. In other words, for each error correction coding block, each of the bits of the error correction coding block is mapped to a respective channel group (comprising a respective group of interleaved bits to be transmitted on a respective channel), wherein for each error correction coding block at least some of the bits of the error correction coding block are mapped to different ones of the channel groups than one another. I.e. a first input bit of a given error correction coding block is mapped to a first channel group, a second bit of the same error correction coding block is mapped to a second channel group, a third bit of the same error correction coding block is mapped to a third channel group, and a fourth bit of the same error correction coding block is mapped to a fourth channel group, and so forth (depending on the size of the error correction coding block), wherein at least some of the first, second, third and fourth channel groups, etc., are different groups (not the same group as one another). Thus each channel group ends up with a plurality of interleaved bits from different error correction blocks. I.e. each channel group thus comprising interleaved bits from a respective selection of multiple of the error correction coding blocks. A "channel group" as referred to herein forms a group of bits to be transmitted on a given channel, comprising bits originating from different error correction blocks. Each channel group thus comprises a different subset of interleaved bits from the error correction blocks, where each subset comprises two or more interleaved bits, and wherein each interleaved bit is either one of the payload bits from one of the error correction blocks or one of the error correction bits from one of the error correction blocks, and across all the channel groups all the payload bits all the error correction bits of the set of error correction blocks are included. In general, one or some of the channel groups could each comprise only payload bits, one or some of the channel groups could each comprise only error correction bits, and one or some of the channel groups may each comprise both one or more payload bits and one or more error correction bits, depending on the mapping. In embodiments each channel group preferably comprises an exclusive subset of bits, i.e. no channel group comprises any of the bits from any other channel group.

The interleaving may be implemented using suitable machine logic steps, including: accessing the input bits of the set of error correction coding blocks from their location in volatile or non-volatile storage (e.g. registers or memory addresses); using machine logic (e.g. software and/or dedicated hardware) to interleave the bits according to the interleaving map; and placing the resulting interleaved bits into an array representing the channel groups in another location in a suitable volatile or non-volatile location, e.g. registers or memory.

The bits of each channel group are transmitted from the transmission interface 110 of the transmitter 102 to the receiving interface 112 of the receiver 104 via a different respective channel allocated to the respective channel group, such that the different groups are transmitted on different ones of the channels Ch0 ... Ch(C−1). At least some of these channels have separable failure modes. For example, some or all of the different channels many be transmitted via different respective units of transmission circuitry Tx0 .... TC(C−1) and/or received via different respective units of reception hardware Rx0 .... Rx(C−1), such that if one unit on one channel fails, it does not necessarily affect any of the others, or at least not all of the others. As another, example, at least some of the different channels Ch0 .... Ch(C−1) may employ different frequencies such that they are susceptible to noise or interference on different frequencies. In one particular target use case, the different channels are different frequency channels multiplexed over a same optical fiber, each transmitted by a respective piece of transmission hardware Tx0 .... Tx(C−1) via an individual respective LED (e.g. uLED).

At the receiver 104, the receiving interface 112 receives the data of each channel group (or a corrupted version thereof) via the respective channel, e.g. via the respective portion of receiving hardware Rx0 .... Rx(C−1). The de-interleaver 114 applies an inverse of the same interleaving map that was applied by the interleaver 108 at the transmitter 104 to produce a received version {ECBs}' of the set of error correction blocks. If there has been no error in transmission or reception, then {ECBs}'={ECBs}. Otherwise they are not equal (but the payloads may or may not be recoverable). The ECC decoder 116 uses the ECC bits in each block to detect whether an error occurred and if so correct the error where possible, thus producing a received version of the message msg'. If the error(s) is/are recoverable given the codes used and the amount of loss, then msg'=msg. Otherwise they are not equal.

The operations performed by the receiver 104 may again be implemented in any suitable machine logic steps, including: accessing bits of the received channel groups from a suitable volatile or non-volatile holding location (e.g. registers or memory) buffing the content received over the channels, accessing the received bits from this location, using machine logic (e.g. software and/or hardware) to de-interleave the received bits into error correction coding blocks {ECBs}' and place the de-interleaved blocks in an array in any suitable form of volatile or non-volatile storage location (e.g. registers or memory), accessing the bits of the de-interleaved blocks from this location, using machine logic (e.g. software and/or hardware) to decode the accessed bits of the de-interleaved blocks into the decoded payload bits msg', and storing these in an array in another location in any suitable volatile or non-volatile storage (e.g. registers or memory).

The mapping performed by the inter-channel interleaving map is such that for at least one channel failure scenario, in which at least one channel fails leaving a plurality of remaining channels, enough bits remain on the remaining channels to enable correction of the message. That is, for an error correction code that can correct up to E bits per error correction coding block, then no more than E bits are lost from any given block such that any block affected by the failed channel(s) can be recovered using the corresponding error correction decoding algorithm (the inverse of the error correction coding) when the channels are deinterleaved and decoded at the receive side. Failure herein could mean complete failure of transmission or reception, or a bit error rate rising above a certain operable threshold. Preferably, the interleaving map is configured to enable recovery of the message in event of any of a plurality of different channel failure scenarios, each possible failure scenario comprising a different failed channel or combination of failed channels. In embodiments, at least one of the failure scenarios accommodated by the map comprises more than one failed channel. In embodiments the interleaving map can accommodate multiple failure scenarios which involve different combinations of multiple failed channels. Any such desired recovery condition may be defined. Note that it is not essential that the interleaving enables recovery of the payload in the face of every possible failure scenario (e.g. no scheme could guard against simultaneous failure of all channels), just that it enables recovery in at least one and preferably some failure scenarios.

By way of example, in FIG. 3 the interleaver 108 applies an interleaving map 304 such that each channel group consists of two interleaved bits, each from different encoding blocks of the input set {ECBs}. Each such interleaved group is transmitted on a different one of twelve channels Ch0 . . . . Ch11. Consider then what would happen if a complete failure was experienced on two of the channels, Ch4 and Ch5, such that none of the bits on either channel are correctly received. If a respective error correction block had simply been sent on each channel, then the payload from both blocks would simply have been lost. However with the inter-channel interleaving, the failure of the two channels results only in one bit being lost from each error encoding block (see the bits marked with a lighting strike). Therefore all the payload bits of all the blocks are fully recoverably by the ECC decoder 116 at the receiver 104.

Figure 4:
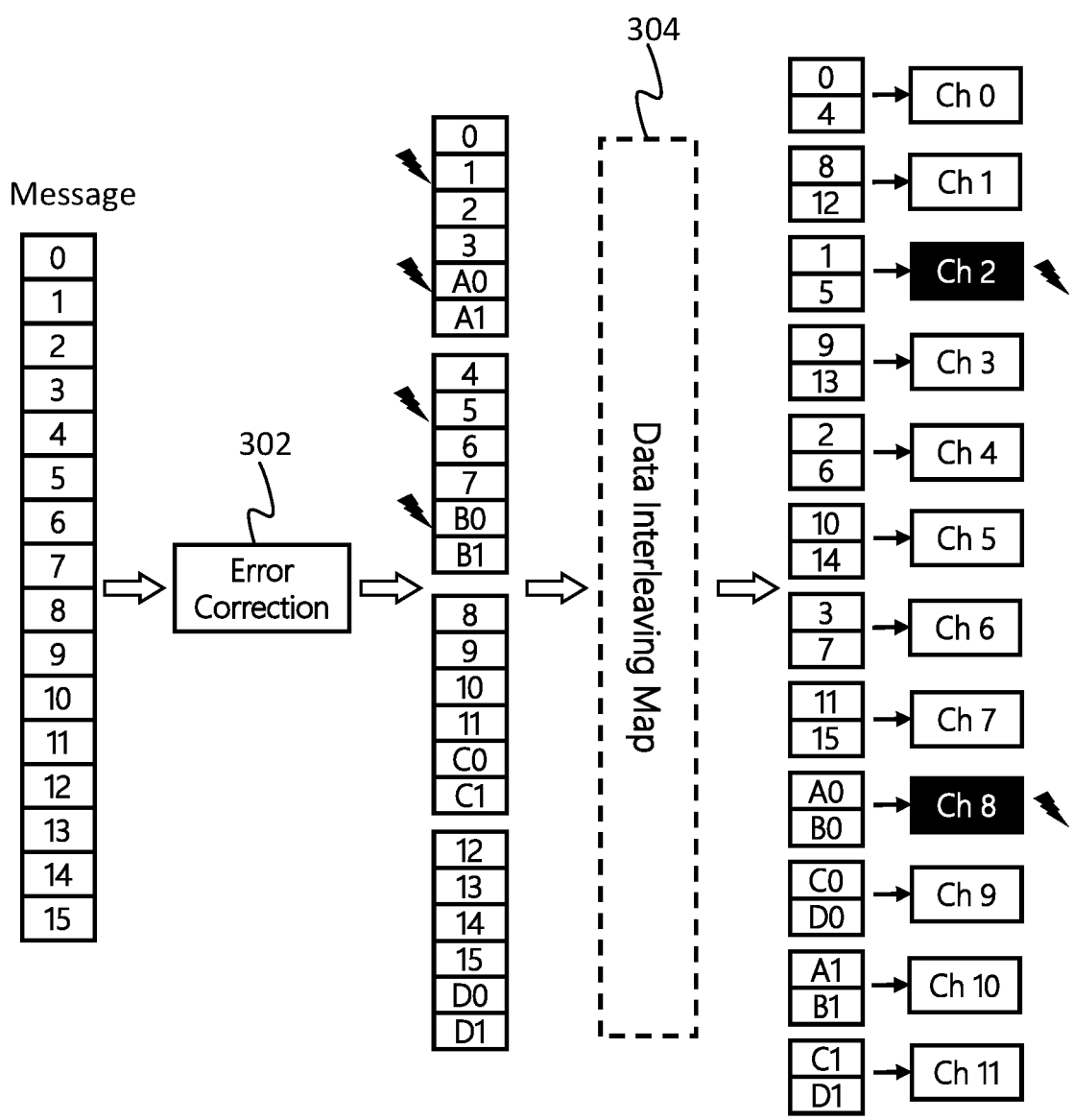
FIG. 4 shows an example of two failed channels whose error bits cannot be corrected by ECC.

FIG. 4 shows an example of two failed channels (Ch2 and Ch8) whose error bits cannot be corrected by ECC when using the same interleaving map as that of FIG. 3. Again in this example, each ECC code block is assumed to correct single bit error.

There is no one exclusive solution for the specific mapping of the interleaving map, and a given map does not necessarily have to cover all possible failure scenarios. In embodiments the interleaver 108 may be configured to determine automatically and analytically an interleaving map that has the property of meeting the desired recovery condition, e.g. enables recovery in a certain predefined set of failure scenarios. Alternatively the designer could design the map analytically at the design stage. Either way, an analytical determination of the map may be based on one or more principles. One such principle may be that the map is configured such that any single channel failure will only cause a single error in the coded data blocks (i.e. each channel group comprises no more than one bit from any given error correction block). Another principle may be that if each block can correct a maximum of E bit errors, then none of the channel groups contains more than E bits from a same encoding block. In embodiments the map may be determined, either automatically or manually, based on one or more analytical formulae that ensure the recovery condition is met for a message of size N, block size B, channel width M, D payload bits per block, and number of correctable bits E per block. Some examples will be discussed in more detail later.

Alternatively, rather than being determined analytically, the interleaving map may be determined empirically, i.e. based on trial and observation. For example, in embodiments the interleaver 108 may be configured to automatically try out one or more possible interleaving maps by applying it to one or more trial messages, and observing whether the map enables the recovery condition to be met, e.g. for a given message size. The set of possible interleaving maps from which to select may be predetermined or randomly generated. A trial message may be an artificial test message, or an actual message comprising actual application data. The trial may be done in an initial configuration stage, or dynamically at run-time, i.e. based on actual application message data being transmitted in-the-field. The observation may be performed at the transmit side, by the interleaver 108 (or an associated component) running a duplicate instance of the de-interleaver 114 and ECC decoder 116 at the transmitter 102. Alternatively the observation may be based on feedback from the ECC decoder 116 at the receiver 104. Either way, if the trialled interleaving map is determined to meet the recovery condition based on the observation, then the interleaver 108 may select it to use as the current map for transmitting the trial message(s) and/or one or more subsequent messages to be transmitted.

In embodiments the interleaver 108 may be configured to automatically switch between different possible interleaving maps dynamically at runtime, e.g. randomly or periodically, or in response to detecting one or more bit errors or channel failures (which again may be based on feedback from the ECC decoder 116 at the receiver 104 or a duplicate instance at the transmitter 102). The possible interleaving maps may be predetermined or randomly generated. Following the switch, the interleaver 108 observes whether the map enables the recovery condition to be met for a current message or messages to be sent. The observation again may be based on either feedback from the ECC decoder 116 at the receiver 104 or a duplicate instance at the transmitter 102. If so the map in question may be selected as the current interleaving map, at least for a period, e.g. until the next random or periodic switch, or until then next time an error or channel failure is detected. If on the other hand the trialled map does not meet the condition, it may be switched out again for another predetermined or randomly generated interleaving map and the trial run again.

As another possibility, a designer may apply a manual empirical approach to determine the interleaving map offline at the design stage.

Figure 8:
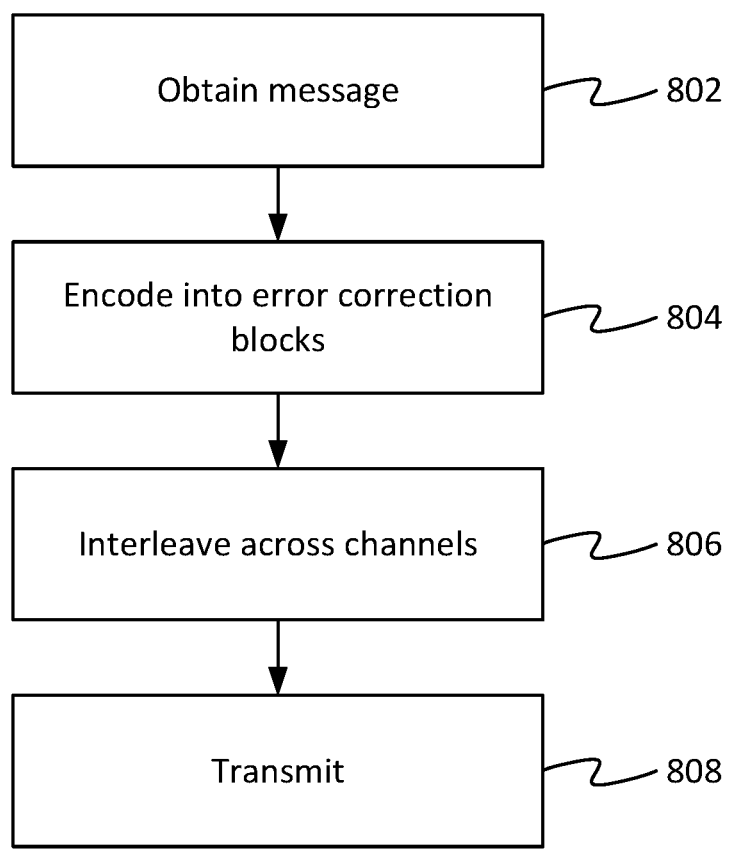
FIG. 8 is a flow chart describing methods disclosed herein.

FIG. 8 illustrates a method applied by a transmitter to transmit data over multiple channels. At step 802 the transmitter obtains a message to be transmitted. The obtaining of the message may comprise generating the message at the transmitter, e.g. by an application run by the transmitter, or may comprise receiving the message from another network component. At step 804 the transmitter encodes the message into a plurality of error correction blocks. At step 806 the transmitter interleaves the bits of the error correction blocks (including both payload bits and ECC bits) channel-wise across a plurality of groups of bits, each group corresponding to a different transmission channel. At step 808 the transmitter transmits each group of bits over the corresponding channel. It will be appreciated that the flow chart of FIG. 8 is somewhat schematized. In some possible implementation, all the steps do not necessarily have to be performed strictly one after another, and some may be performed partially in parallel. E.g. the transmitter could be transmitting one group of bits over one channel while still forming the group for another channel.

A receiver performs the inverse of the steps 804-808 of FIG. 8 in order to receive the message.

All of the disclosed operations or method steps, including those expressed in mathematical terms, may be implemented using suitable machine logic steps (e.g. interleaving by moving or copying input bit(s) from error correction coding block array address(es) in memory to channel group array address(es) in memory, etc.).

Some more detailed examples for determining an interleaving map are now discussed.

Example Channel Interleaving

The data message to be sent by transmit side are firstly encoded into multiple ECC coding blocks. As discussed earlier, one straightforward approach would be to send each coding block through a single data transmission channel. However this will only improve the channel BER but cannot tolerate any channel failure. Therefore instead, an alternative approach disclosed herein is to send each ECC coding block through multiple transmission channels.

To demonstrate an example of this approach, FIG. 3 shows an example of using ECC with data interleaving to correct and locate error bits from failed multiple data channels, in this example two failed channels (Ch4 and Ch5). Each ECC code block is assumed to correct single bit error.

A 16-bit message is sent over 12 data transmission channels. Since the transmit side and receive side of the communication system are symmetric, only the transmit side is shown for simplicity. The data message firstly encoded into 4 ECC coding blocks. Their data bits are interleaved across all 12 channels. The data interleaving map can be fixed or runtime changeable. In this example, the ECC algorithm is like a Hamming code that corrects a single bit error in a coding block. As illustrated, it uses 2 parity bits as redundancy for each 4 data bits. The resulting error protection allows up to 2 channel failures in 12 channels. The 4 parallel error bits sent over failed channels 4 and 5 originate from 4 coding blocks. ECC decoding can correct all of these error bits. At the same time, the receive side can locate these error bits through ECC. With the data interleaving map, it is further possible to locate which channels are failed.

For a given data interleaving map, not any amount and combination of failed channels can be recovered by ECC. In practice, failures usually do not appear in a burst pattern. When a new failure occurs, in embodiments the interleaver 108 will alternate the data interleaving map at runtime. Since both error bits in coding block and failed/bad channels can be located, it can calculate to select the next interleaving from a list of pre-implemented ones. The next mapping should be better at spreading existing errors evenly across different coding blocks. If the failure or error patterns are known, this can also be added into the calculation so that the selection is aware of new errors that will be covered by the coding blocks without existing errors. That is, for the case where it is possible to predict where future channel failures or errors will appear or are likely to appear, then by selecting a specific interleaving map, one can form the coding blocks that contain these future error bits, and have no or minimized amount of existing errors. This helps to increase the probability of tolerating future channel failures.

Here is the parameter list for the formalized problem of selecting data interleaving map:

| | |
|---|---|
| Message stream parallel bit width | N |
| Channel interface parallel bit width | M |
| Coding block size (bits) | B |
| Data payload size (bits) per coding block | D |
| Number of errors can be corrected in each coding block | E |
| Number of channels | C |

The relationship between N and M can be described by the following equation:

$$\frac{N}{D}B = MC$$

In practice, C is given based on the physical setup. M and N can usually be selected from a set of values, which are determined by the supported serial-to-parallel factor in the SerDes circuits (serializer-deserializer circuits). B, D and E are also related to the choice of ECC algorithm. There can be several combinations of these parameters. The choice can be the result of trade-offs between error protection capability, ECC circuit complexity and serial-parallel conversion availability in SerDes. In the example of FIG. 3, we have C=12, N=16, M=2, B=6, D=4.

Given the aforementioned relationship, the data interleaving map may be determined as a function F( ). All the bits of the error encoding blocks at the transit side may be indexed under a common index scheme x=0 . . . (NB/D)−1 across the error correction blocks, where N/D is the number of blocks and NB/D is the total number of bits in all the error correction blocks for a given message. That is, the bits of error encoding blocks which form the input to the interleaving map (including both the payload bits and error encoding bits) are indexed in order across the full set of blocks {ECBs}, in order from x=0 at a first bit of a first of the error correction blocks to x=B−1 at a last bit of the first error correction block, then from x=B at a first bit of a next of the error correction blocks to x=2B−1 at a last bit of the next encoding block, and so forth, up to x=(NB/D)−1 at a last bit of a last of the error correction blocks. Put another way, a first subrange of a first B of the input bits in the order of the value x is a first of the error correction blocks, a second subrange of a second B of the input inputs in the order of x is a second of the error correction blocks, and so forth. This may be expressed mathematically as b=[x/B] b=⌊x/B⌋ where ⌊ ⌋ is a floor function which rounds down to the nearest integer and b is an index of the error encoding block within the set {ECBs}' for a given input message. Thus each bit within each error encoding block for a given message is assigned a unique bit index that is unique across the set of error encoding blocks {ECBs}.

Then, given the index of a bit, x in the parallel bits of the encoded message stream, a linear equations F( ) can be applied to map each bit at index x onto an interleaved bit index y=F(x), such as:

$$y = \left(\text{Max} + \left\lfloor \frac{x}{B} \right\rfloor\right) \% (MC),$$

where α=2, M=2, B=6, C=12 for the case in FIG. 3, and % is the modulo operator. More generally a can be other value. Here it is 2 because bits are assigned to every other 2 channels cyclically. But more generally a is the cyclic distance of the mapping of bits from an error correction coding block to channel groups, i.e. bits from a block are assigned to every other a channels (every $a^{th}$ channel). In other words, from a given error correction coding block, bits are assigned in turn to every $a^{th}$ channel group. So in the example of FIG. 3 where α=2, the bit at index x=0 from the set of error correction coding blocks is mapped to a channel at a first value of channel index c (in this case c=0), and the next bit at index x=1 from the set of error correction coding blocks is mapped to the channel c+2 (or more generally c+α), and the third bit at x=2 from the set of error correction blocks is mapped to channel c+4 (or more generally c+2α), and so forth. A may be any integer constant (in embodiments a positive integer).

A relation c=⌊y/M⌋ can then be applied in order to calculate the index c of the channel (and therefore channel group) to which the interleaved bit y is assigned, where again ⌊ ⌋ is a floor function which rounds down to the nearest integer. The index y is the index of the bits in the interleaved space after the application of the interleaving map. The mapping distributes the bits from the error encoding blocks across the channel groups in order of the interleaved index y, from y=0 at a first bit of a first of the channel groups to y=MC−1 at last bit of a last of the channel groups. In other words, the first M bits in order of index y are assigned to a first channel group, then a next M bits in order of y are assigned to a next channel group, and so forth.

The intuition behind the above formula is to assign bits from the coding block cyclically into every other 2 channels (or more generally every other a). If one channel is full of M bits, the next consecutive channel is selected to fill.

Figure 5:
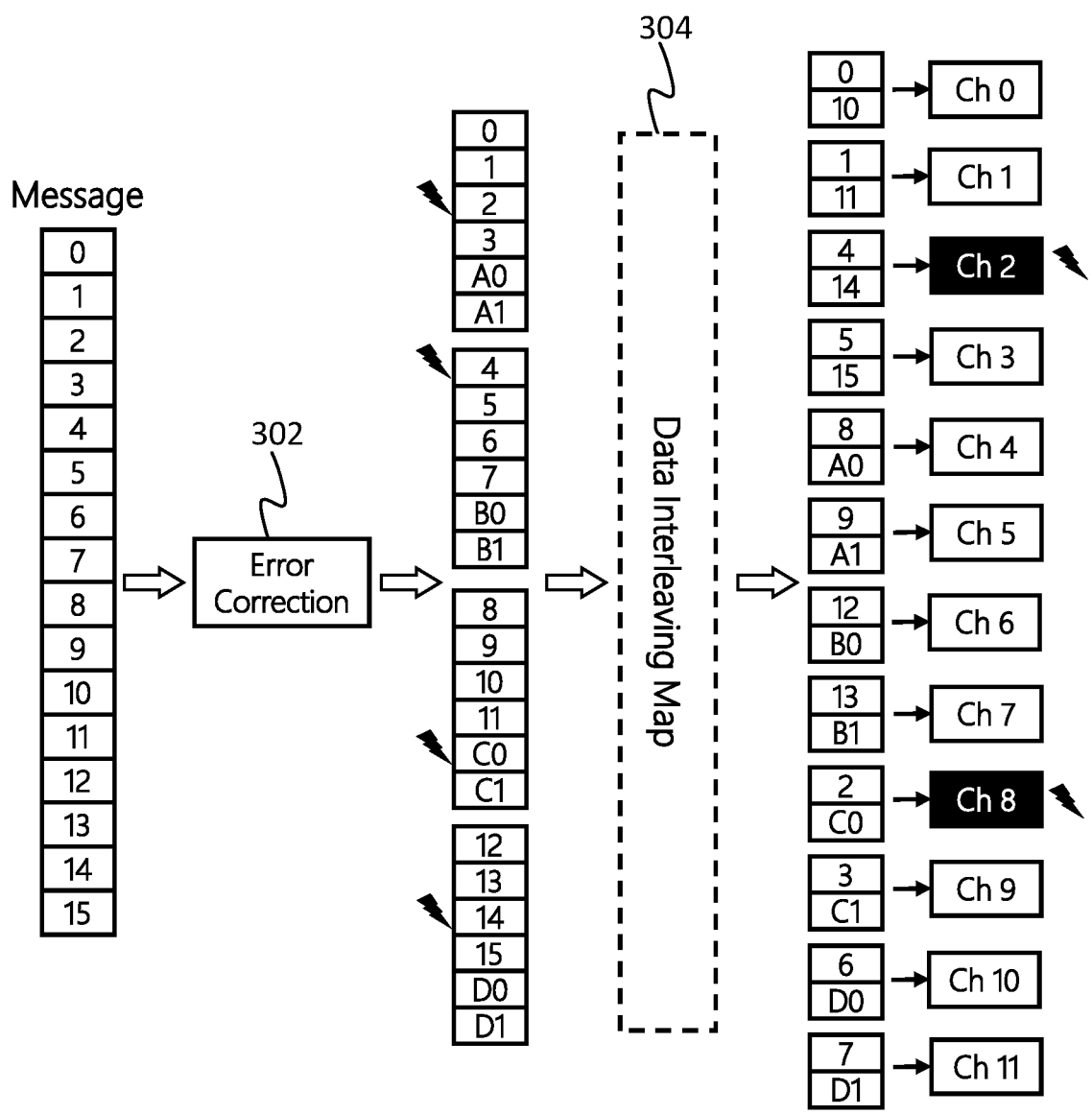
FIG. 5 illustrates an example method using an alternative data interleaving map that can make ECC correct error bits from two failed channels, FIG. 6 illustrate an example method of using backup channels to support hot-swapping any failed data channels.

FIG. 5 shows an example of an interleaving map determined according to an alternative relationship. This is an example of an alternative data interleaving map that can make ECC correct error bits from two failed channels, Ch2 and Ch8 (c.f. the example of FIG. 4). Each ECC code block is again assumed to correct single bit error. In FIG. 5, the mapping assigns every 2 bits in a coding block into different channels, and goes over coding blocks cyclically. I.e. the mapping goes over each coding block cyclically and maps selected bits to channels one by one cyclically. It takes 2 consecutive bits from one coding block. It then assign these 2 bits to the next 2 consecutive channels. It uses the following mapping equations:

$$k = M(\alpha \lfloor x/B \rfloor + x\%\alpha) + M\beta \left\lfloor \frac{x\%B}{\alpha} \right\rfloor,$$

$$y = k\% \ (MC) + \lfloor k/(MC) \rfloor,$$

where $\alpha=2$, $\beta=8$, $M=2$, $B=6$, $C=12$. In this alternative mapping, alpha and beta have different principles. The constant $\alpha$ comes from getting every 2 bits from a coding block, but more generally could take other integer values. $\beta$ is the number of bits (in this case 8) from going over one cycle of 4 coding blocks. More generally, $\beta=\alpha N/D$.

To elaborate, $M(\alpha \lfloor x/B \rfloor + x \% \alpha)$ is to calculate bit index within 8 bits of the current cycle of 4 coding blocks.

$$M\beta \left\lfloor \frac{x\%B}{\alpha} \right\rfloor,$$

is to calculate which cycle of 4 coding blocks and apply this as a multiple of $M\beta$ (2*8) to be the output index offset. $y=k \% (MC) + \lfloor k/(MC) \rfloor$ is to fold k into the indexing space of 12 channels which is from 0 to 23 (0 to M*C−1).

When selecting the interleaving map, one preferred principle which may be specified is to make each channel have bits from (M/E) different coding blocks. In the disclosed examples, this requires each channel to have bits from 2 different coding blocks. Another principle could be that each channel group comprises no more than one bit from any given error correction block, or that none of the channel groups contains more than E bits from a same one of the error encoding blocks. A narrower principle could also be specified from a combination of two or more such principles.

The way of determining the mapping equation is not bounded. More generally, three possible ways are:
1) work out an equation analytically to meet the specified principle (as in the above examples), or
2) randomly shuffle the indices and check whether this satisfies the specified principle,
3) use some heuristic algorithms to determine a mapping that satisfies the principle (where heuristic algorithms refer to search algorithms, e.g. simulated annealing or a genetic algorithm, which may find satisfying interleaving maps in a faster way than random shuffle).

In a circuit-level implementation, these mappings can be stored in lookup tables to simplify the logic of getting them at run time. Also, if the area is allowed, the mappings can also be pre-implemented and then switched when needed.

Hot Swapping

In embodiments, the interleaver 108 may be configured to detect a problem channel from among the channels currently being used for transmissions, where the problem channel could be a failed channel or a channel or a channel that is still functional but whose bit error rate has fallen below a threshold. Either way, the interleaver 108 may be configured so as, in response to the detecting the problem channel, to switch the group of bits that were being transmitted on the problem channel to being transmitted over a back-up channel, the back-up channel being an additional channel in addition to the existing channels that were being used for transmission of the message.

The problem channel may be a channel that has failed, i.e. either completely failed, or its bit error rate has risen so high that full recovery of the message is no longer possible using the error correction bits received across the channels. Alternatively, recovery of the message may still be possible, but the bit error rate on one of the channels being used may be detected to have risen above a certain threshold, which may be indicative of a poor quality channel that is likely to fail soon, or at least has a certain likelihood of failing soon.

In such cases, the interleaver 108 may dynamically swap the problem channel for a back-up channel, dynamically at runtime. This is referred to herein as "hot swapping". I.e. the group of bits (the "channel group") that was being transmitted on an existing channel is switched over to now be transmitted on a back-up channel.

In the case of a channel whose BER has risen above a threshold but the message is still recoverable, the interleaver 108 may swap the high error-rate channel for a back-up channel while the receiver continues to recover the message. Thus embodiments disclosed herein use ECC to correct errors in the foreground; such that ECC will keep the communication link alive when channel failure happens, while hot swapping can be done in the background with no impact to the live bandwidth.

Either way, the error correction bits and the interleaving map to locate the failed or erroneous channel. This may be done at the transmit side or based on feedback from the receive side.

Figure 6:
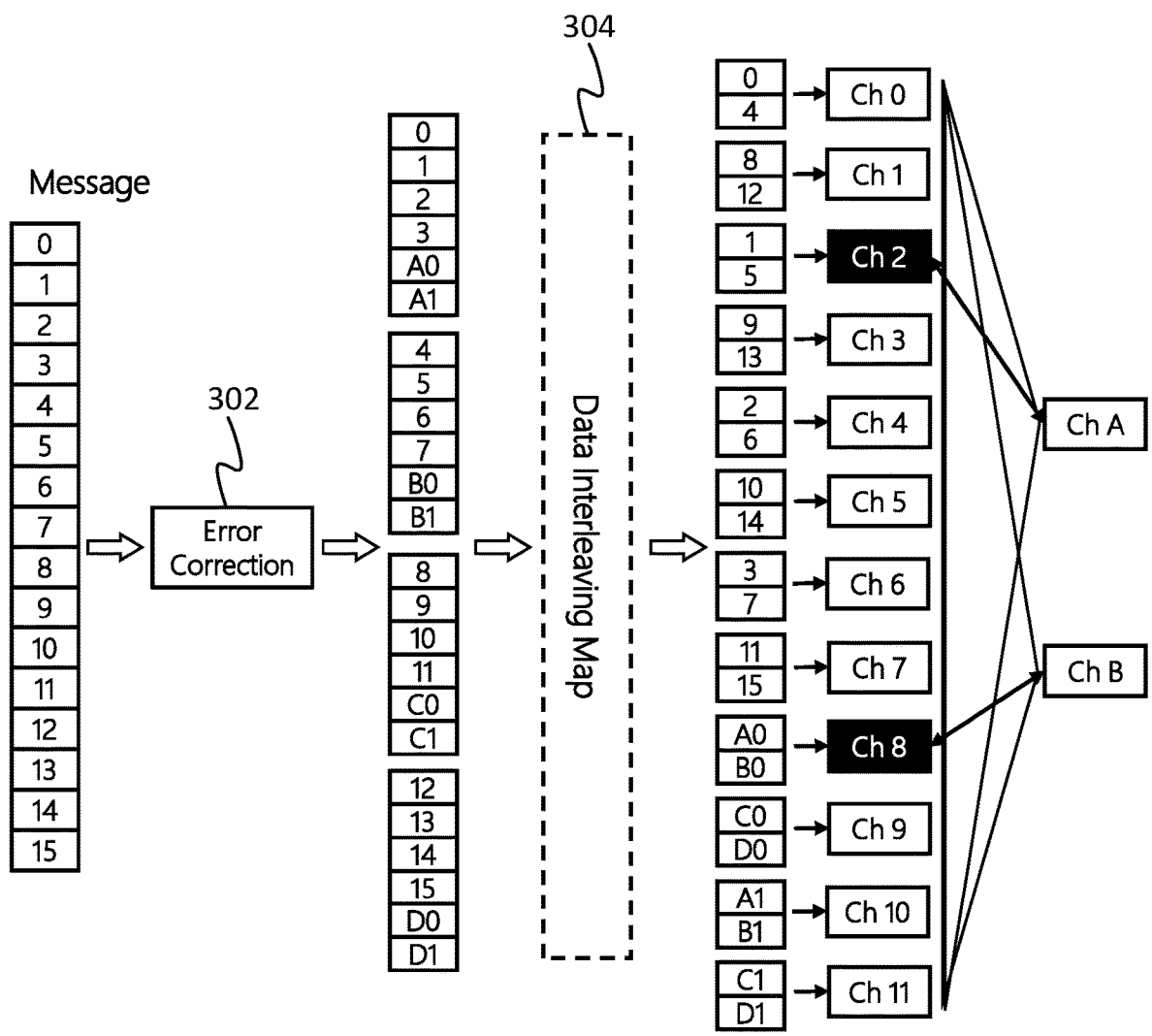

FIG. 6 shows an example of using backup channels to support hot-swapping any failed data channels. In this example, when channel Ch2 fails, it is replaced with back-up channel ChA, and when channel Ch8 fails it is replaced with back-up channel ChB.

ECC alone can be sufficient for transmission channels with relatively low failure rate, e.g. DRAM interfaces, or chip-to-chip interfaces. However in other applications, hot swapping may be desirable. In a communication system with multiple transmission channels, MC bits can be sent over all channels at each time. Assuming ECC coding block size is B bits, there are up to MC/B error bits that can be fixed. For example if MC=600 and B=12, then 50 failed channels can be recovered in the best case. However, only 400 channels are for the actual data transmission due to 50% redundancy needed for ECC. For systems using many channels like this, recovering 8.3% channels with 50% redundancy can be too expensive.

In some cases, such as light-based data communication, the transmission channels have higher failure rate. These scenarios demand high percentage of channels to be recovered, which can be 10-30%. Relying on ECC alone may be deemed impractical in some such cases. Embodiments disclosed herein therefor provide an approach of hot-swapping backup channels to overcome the cost of redundancy. If any failed or problem channel is found, one of the backup channels will be used to replace that channels to run a new data channel. Therefore, the hot-swapping approach allows the redundancy rate to be same as the recovery rate.

Combining with Time Interleaving

In embodiment, some of the plurality of channels used being used for the transmission are implemented on different transmission frequencies than one another, but some of the channels include a plurality of time division multiplexed channels implemented over a same one of the transmission frequencies. In other words, for each of one or more of the transmission frequencies, that transmission frequency is used to transmit multiple time-division multiplexed channels. I.e. the channels employ a combination of frequency division multiplexing and time division multiplexing. This approach may also be combined with hot swapping in order to reduce the amount of multiplexing circuitry needed to implement the hot swapping.

More generally this may be extended to any combination of time-division multiplexing with a plurality of separate units of transmission hardware Tx in the transmission interface 110, such that each unit of transmission hardware implements the transmission over a respective subset one or more if the channels Ch, and at least one of the units of transmission hardware Tx implements multiple of the channels time-division multiplexed through the same transmission hardware. The different units of transmission hardware may correspond to different transmission frequencies (e.g. different optical frequencies), or different physical paths (e.g. different fibers or cables), or different combinations of transmission frequency and physical path.

Figure 7:
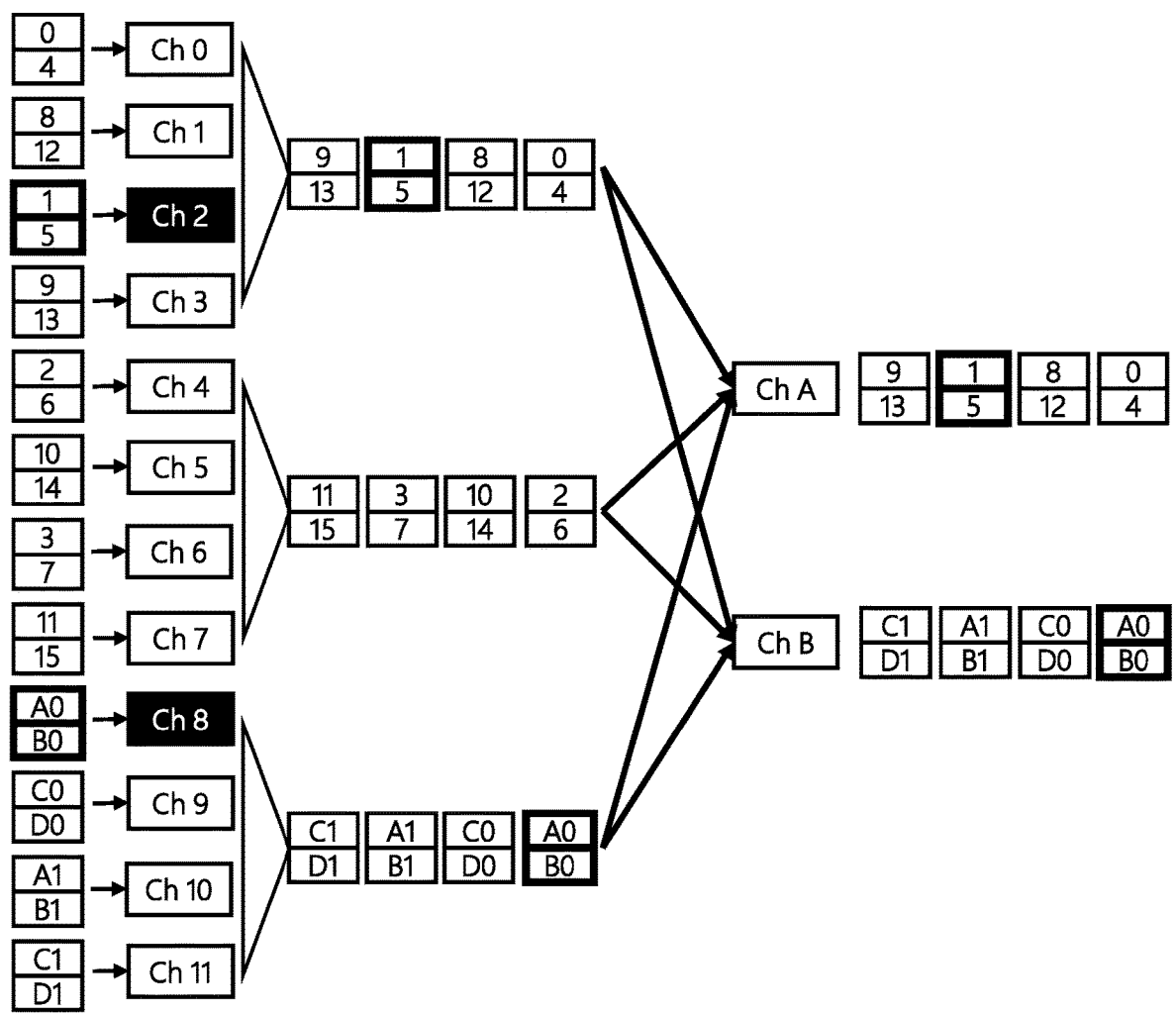
FIG. 7 illustrates an example method of combining time and spatial multiplexing.

FIG. 7 shows an example of combining time and spatial multiplexing to reduce the switching circuit area of hot-swapping. Channels Ch0-Ch3 are time multiplexed onto a first transmission frequency, channels Ch4-Ch7 are time multiplexed onto a second transmission frequency, and channels Ch8-Ch11 are time multiplexed onto a third transmission frequency. Then if any of the physical channels of a given transmission frequency fails (or exceeds a threshold error rate), it can be hot-swapped for a different physical channel. Since there are now only three physical channels, instead of twelve as in FIG. 6, this reduces the amount of multiplexing circuitry required to implement hot swapping.

Such an approach may be desirable, as a hot-swapping operation may be deemed onerous to implement in some modern digital integrated circuit (IC) systems, since it will need many multiplexers (MUXs). For example, FIG. 6 shows each backup channel needing 12-to-1 multiplexers on the transmit side. When the number of data and backup channels grow, the number and size of these MUXs will grow together. One alternative approach would be to group channels and connect each group to a fraction of backup channels. This can reduce the MUX size and complexity, but the channel recovery coverage is also partitioned. If there are failed channels more than assigned backups in a group, the entire communication will be failed.

In example use cases, there may be e.g. 400 channels with 15% recovery, which will cost 60×400-to-1 MUXs. To overcome this challenge, part of the spatial multiplexing may be converted into scheduling in the time domain. Every G channels are made into a group of data channels. Equivalently, every K backup channels are grouped too. Given C data channels with R backups, this approach can reduce the MUX connectivity as C/G-to-R/K crossbar. The grouped data bits will be sent through this reduced scale crossbar at G×K faster clock speed. In FIG. 7 the example has N=12, G=4, R=2, and K=1. The data bits of failed channel 2 will be sent at 4× higher clock speed into the 3-to-2 crossbar instead of a 12-to-2 crossbar. The backup channel A will receive the data bits at the second time slot based on the runtime-determined schedule. Since the receive side is symmetric, same grouping and equivalent de-multiplexers are applied there.

In terms of IC implementation, the above-disclosed approach can significantly save silicon area. To save power on high-speed crossbar circuits, we can also leverage state-of-the-art low power IC techniques. Due to low power demands of mobile chips, they are available in leading silicon fabrication technology nodes.

CLOSING REMARKS

It will be appreciated that the above embodiments have been disclosed by way of example only.

More generally, according to one aspect disclosed herein, there is provided a method of transmission, the method comprising: obtaining a message comprising multiple payload bits; encoding the message into a plurality of error correction coding blocks, each error correction coding block comprising a respective block of input bits, each block of input bits comprising a different respective portion of the payload bits of the message and a respective plurality of error correction bits; applying an interleaving map to the plurality of error correction coding blocks, resulting in, for each error correction coding block, each of the input bits of the error correction coding block being mapped to a respective channel group to be transmitted on a respective channel for the respective channel group from among a plurality of channels, the respective channels being different than one another, wherein for each error correction coding block at least some of the input bits of the error correction coding block are mapped to different ones of the channel groups than one another, each channel group thus comprising interleaved bits from a respective selection of multiple of the error correction coding blocks, such that for at least one channel failure scenario in which at least one of the plurality of channel fails leaving a plurality of remaining channels, enough bits will remain on the remaining channels to enable correction of the message; and transmitting each of the channel groups via the respective channel.

In other words, there is provided a method of transmission comprising: obtaining a message comprising multiple payload bits; encoding the message into a plurality of error correction coding blocks, each error correction coding block comprising a different respective portion of the payload bits of the message and a respective plurality of error correction bits; applying an interleaving map to the plurality of error correction coding blocks, resulting in the plurality of error correction coding blocks being interleaved across a plurality of channel groups, each channel group thus comprising a plurality of interleaved bits; and transmitting each of the channel groups via a different one of a plurality of channels; wherein for each error correction coding block, the interleaving map maps different bits of the error correction coding block to different channel groups, each channel group thus comprising interleaved bits from different ones of the error correction coding blocks, such that for at least one channel failure scenario in which at least one of the plurality of channel fails leaving a plurality of remaining channels, enough bits remain on the remaining channels to enable correction of the message.

I.e. the interleaving map is configured such that, for an error correction coding whereby the error correction bits can correct up to E bits per error correction coding block, then no more than E bits from any given error correction block are lost in the (at least one) failure scenario.

In embodiments, the interleaving map may satisfy one, more or all of: i) each channel group comprises no more than one bit from any given one of the error correction coding blocks; and/or ii) none of the channel groups contains more than E bits from a same one of the error encoding coding blocks, where E is a maximum number of errors that can be corrected per error correction coding block; and/or iii) each channel group comprises bits from (M/E) different ones of the error correction coding blocks, where each channel group is M bits wide.

In embodiments (N/D) B=MC, where the message is N bits wide, each channel group is M bits wide, each encoding block is B bits wide with D payload bits per block, and the plurality of channels is C channels in number; wherein the input bits of the plurality of error correction coding blocks together form a sequence of input bits which are indexed by respective values of an input index x in order from a first bit of a first of the error correction coding blocks to a last bit of a last of the error correction coding blocks; wherein the interleaving map interleaves each value of the input index x in the set of input bits to a respective value of an interleaved index y, and determines an index of the channel group for each interleaved bit as equal to $\lfloor y/M \rfloor$ where $\lfloor \, \rfloor$ is a floor function that rounds down to the nearest integer; and wherein either:

$$y = \left(\text{Max} + \left\lfloor \frac{x}{B} \right\rfloor\right) \% (MC),$$

where % is a modulo operator and a is an integer constant; or $$y = k\% (MC) + [k/(MC)],$$

where % is a modulo operator, $$k = M\left(\alpha \lfloor x/B \rfloor + x\%\alpha\right) + M\beta \left\lfloor \frac{x\%B}{\alpha} \right\rfloor,$$

α is an integer constant and β=αN/D.

In embodiments, the method may comprise dynamically alternating the interleaving map at run time.

In embodiments, the method may comprise detecting that the at least one channel has failed, and in response selecting the interleaving map as a map that enables the correction of the message.

In embodiments, the method may comprise: determining a candidate bit mapping, either randomly or by selecting from among a plurality of predetermined mappings or by searching using a heuristic algorithm; trialling the candidate bit mapping to check the candidate bit mapping meets a recovery condition, the recovery condition comprising a condition that the candidate bit mapping would enable correction of the message in each of a predetermined set of one or more failure scenarios if used as the interleaving map; and in response to determining based on the trialling that the candidate bit mapping does meets the recovery condition, selecting the candidate bit mapping as the interleaving map.

In embodiments, the method may comprise: detecting a problem channel from among the plurality of channels, wherein the problem channel is either a failed channel or a channel having a bit error rate detected to exceed a threshold; and in response to the detecting of the problem channel, switching the channel group of the problem channel to being transmitted over a back-up channel, the back-up channel being an additional channel in addition to said plurality of channels.

In embodiments, at least some of the plurality of channels may be implemented on different transmission frequencies than one another. In some such embodiments, the plurality of channels may be multiplexed over an optical fibre.

In embodiments, at least some of the plurality of channels may be implemented via different units of transmission hardware than one another, and for each of at least one of the units of transmission hardware, the unit of transmission hardware may implement multiple of the plurality of channels time-division multiplexed through the unit of transmission hardware. In such embodiments the method may comprise detecting one of the units of transmission hardware having a failed channel or a channel with an error rate below a threshold, and in response swapping said one of the units of transmission hardware with a back-up unit of transmission hardware.

For example, each of the units of transmission hardware may be arranged to transmit on a different respective transmission frequency or over a different respective physical transmission path.

In embodiments, the interleaving map may enable recovery of the message in event of any of a plurality of different channel failure scenarios, each with a different failed channel or combination of failed channels. In some such embodiments, at least one of the failure scenarios comprises more than one failed channel.

According to another aspect disclosed herein, there is provided non-transitory computer-readable storage comprising a program configured so as when run on one or more processors to perform the transmission method of any embodiment disclosed herein.

According to another aspect, there is provided a transmitter comprising: an error correction encoder configured to encode multiple payload bits of a message into a plurality of error correction coding blocks, each error correction coding block comprising a respective block of input bits, each block of input bots comprises a different respective portion of the payload bits of the message and a respective plurality of error correction bits, each portion comprising two or more of the payload bits; an interleaver configured to apply a data interleaving map to the plurality of error correction coding blocks, resulting in, for each error correction coding block, each of the input bits of the error correction coding block being mapped to a group of bits for transmission on a unique respective channel for the channel group from among a plurality of channels, wherein for each error correction coding block at least some of the input bits of the error correction coding block are mapped to different ones of the groups than one another, each group thus comprising interleaved bits from a respective selection of multiple of the error correction coding blocks, such that for at least one channel failure scenario in which at least one of the plurality of channel fails leaving a plurality of remaining channels, enough bits will remain on the remaining channels to enable correction of the message; and a transmission interface configured to transmit each of the groups via the respective channel.

According to another aspect there is provided a method of receiving data, the method comprising: receiving a different respective group of interleaved bits over each of a plurality of channels; applying an inverse of an interleaving map to the groups of interleaved bits in order to recover a plurality of error correction encoding blocks, each error correction encoding block comprising a different respective portion of payload bits of a message and a respective plurality of error correction bits; and determining the message from the encoding blocks; wherein for each error correction coding block, the interleaving map maps each of the input bits of the error correction coding block to a respective group of interleaved bits received on a respective channel, wherein for each error correction coding block at least some bits of the error correction coding block are mapped to different ones of the groups than one another, each group thus comprising interleaved bits from a respective selection of multiple of the error correction coding blocks, such that for at least one channel failure scenario in which at least one of the plurality of channel fails leaving a plurality of remaining channels, enough bits remain on the remaining channels to enable recovery of the message.

According to another aspect, there is provided non-transitory computer-readable storage comprising a program configured so as when run on one or more processors to perform the reception method of any embodiment disclosed herein.

According to another aspect there is provided a receiver comprising: memory comprising one or more memory devices, processing apparatus comprising one or more processors, and a receiving interface for transmitting over a network; wherein the memory stores code software arranged to run on the processing apparatus, and configured so as when run on the processing apparatus to perform the reception method of any embodiment disclosed herein.

According to another aspect, there is provided a system comprising the transmitter and receiver of any embodiments disclosed herein.

In embodiments, the transmission interface may comprise a plurality of different units of transmission hardware, each configured to perform the transmission over a respective subset of the plurality of channels time-division multiplexed through the unit of transmission hardware, each of the subsets of channels comprising two or more of the plurality of channels; and the transmitter may comprise multiplexing circuitry configured to direct each group of interleaved bits to a corresponding one of the units of transmission hardware for the respective channel over which the group is to be transmitted. In such embodiments, the interleaver may be configured to detect one of the units of transmission hardware having a failed channel or a channel with an error rate above a threshold, and in response to swap the respective subset of channels from said one of the units of transmission hardware to a back-up unit of transmission hardware, the back-up unit of transmission hardware being an additional unit off transmission hardware in addition to said plurality of units of transmission hardware.

Other variants or use cases may become apparent to a person skilled in the art once given the disclosure herein. The scope of the present disclosure is not limited by the above-described embodiments, but only by the accompanying claims.

The invention claimed is:

1. A method of transmission, the method comprising:
obtaining a message comprising multiple payload bits;
encoding the message into a plurality of error correction coding blocks, each error correction coding block comprising a respective block of input bits, each block of input bits comprising a different respective portion of the payload bits of the message and a respective plurality of error correction bits;
applying an interleaving map to the plurality of error correction coding blocks, resulting in, for each error correction coding block, each of the input bits of the error correction coding block being mapped to a respective channel group to be transmitted on a respective channel for the respective channel group from among a plurality of channels, the respective channels being different than one another, wherein for each error correction coding block at least some of the input bits of the error correction coding block are mapped to different ones of the channel groups than one another, each channel group thus comprising interleaved bits from a respective selection of multiple of the error correction coding blocks, such that for at least one channel failure scenario in which at least one of the plurality of channel fails leaving a plurality of remaining channels, enough bits will remain on the remaining channels to enable correction of the message; and
transmitting each of the channel groups via the respective channel.

2. The method of claim 1, wherein one, more or all of:
each channel group comprises no more than one bit from any given one of the error correction coding blocks; and/or
none of the channel groups contains more than E bits from a same one of the error encoding coding blocks, where E is a maximum number of errors that can be corrected per error correction coding block; and/or
each channel group comprises bits from (M/E) different ones of the error correction coding blocks, where each channel group is M bits wide.

3. The method of claim 1, wherein:

$(N/D)B=MC$, where the message is N bits wide, each channel group is M bits wide, each encoding block is B bits wide with D payload bits per block, and the plurality of channels is C channels in number;
wherein the input bits of the plurality of error correction coding blocks together form a sequence of input bits which are indexed by respective values of an input index x in order from a first bit of a first of the error correction coding blocks to a last bit of a last of the error correction coding blocks;
wherein the interleaving map interleaves each value of the input index x in the set of input bits to a respective value of an interleaved index y, and determines an index of the channel group for each interleaved bit as equal to $\lfloor y/M \rfloor$ where $\lfloor \ \rfloor$ is a floor function that rounds down to the nearest integer; and
wherein either:

$$y = \left(\text{Max} + \left\lfloor \frac{x}{B} \right\rfloor\right) \% (MC),$$

where % is a modulo operator and $\alpha$ is an integer constant; or . . .

$y = k \% (MC) + \lfloor k/(MC) \rfloor$, where % is a modulo operator, $$k = M(\alpha \lfloor x/B \rfloor + x\%\alpha) + M\beta \left\lfloor \frac{x\%B}{\alpha} \right\rfloor,$$

$\alpha$ is an integer constant and $\beta = \alpha N/D$.

4. The method of claim 1, comprising dynamically alternating the interleaving map at run time.

5. The method of claim 1, comprising detecting that the at least one channel has failed, and in response selecting the interleaving map as a map that enables the correction of the message.

6. The method of claim 1, comprising:
determining a candidate bit mapping, either randomly or by selecting from among a plurality of predetermined mappings or by searching using a heuristic algorithm;
trialling the candidate bit mapping to check the candidate bit mapping meets a recovery condition, the recovery condition comprising a condition that the candidate bit mapping would enable correction of the message in each of a predetermined set of one or more failure scenarios if used as the interleaving map; and
in response to determining based on the trialling that the candidate bit mapping does meets the recovery condition, selecting the candidate bit mapping as the interleaving map.

7. The method of claim 1, comprising:
detecting a problem channel from among the plurality of channels, wherein the problem channel is either a failed channel or a channel having a bit error rate detected to exceed a threshold; and
in response to the detecting of the problem channel, switching the channel group of the problem channel to being transmitted over a back-up channel, the back-up channel being an additional channel in addition to said plurality of channels.

8. The method of claim 1, wherein at least some of the plurality of channels are implemented on different transmission frequencies than one another.

9. The method of claim 1, wherein at least some of the plurality of channels are implemented via different units of transmission hardware than one another, and for each of at least one of the units of transmission hardware, the unit of transmission hardware implements multiple of the plurality of channels time-division multiplexed through the unit of transmission hardware; and
wherein the method comprises detecting one of the units of transmission hardware having a failed channel or a channel with an error rate below a threshold, and in response swapping said one of the units of transmission hardware with a back-up unit of transmission hardware.

10. Non-transitory computer-readable storage comprising a program configured so as when run on one or more processors to perform the method of claim 1.

11. A transmitter comprising:
an error correction encoder configured to encode multiple payload bits of a message into a plurality of error correction coding blocks, each error correction coding block comprising a respective block of input bits, each block of input bots comprises a different respective portion of the payload bits of the message and a respective plurality of error correction bits, each portion comprising two or more of the payload bits;
an interleaver configured to apply a data interleaving map to the plurality of error correction coding blocks, resulting in, for each error correction coding block, each of the input bits of the error correction coding block being mapped to a group of bits for transmission on a unique respective channel for the channel group from among a plurality of channels, wherein for each error correction coding block at least some of the input bits of the error correction coding block are mapped to different ones of the groups than one another, each group thus comprising interleaved bits from a respective selection of multiple of the error correction coding blocks, such that for at least one channel failure scenario in which at least one of the plurality of channel fails leaving a plurality of remaining channels, enough bits will remain on the remaining channels to enable correction of the message; and
a transmission interface configured to transmit each of the groups via the respective channel.

12. A method of receiving data, the method comprising:
receiving a different respective group of interleaved bits over each of a plurality of channels;
applying an inverse of an interleaving map to the groups of interleaved bits in order to recover a plurality of error correction encoding blocks, each error correction encoding block comprising a different respective portion of payload bits of a message and a respective plurality of error correction bits; and
determining the message from the encoding blocks;
wherein for each error correction coding block, the interleaving map maps each of the input bits of the error correction coding block to a respective group of interleaved bits received on a respective channel, wherein for each error correction coding block at least some bits of the error correction coding block are mapped to different ones of the groups than one another, each group thus comprising interleaved bits from a respective selection of multiple of the error correction coding blocks, such that for at least one channel failure scenario in which at least one of the plurality of channel fails leaving a plurality of remaining channels, enough bits remain on the remaining channels to enable recovery of the message.

13. Non-transitory computer-readable storage comprising a program configured so as when run on one or more processors to perform the method of claim 12.

14. A receiver comprising:
memory comprising one or more memory devices,
processing apparatus comprising one or more processors, and
a receiving interface for transmitting over a network;
wherein the memory stores code software arranged to run on the processing apparatus, and configured so as when run on the processing apparatus to perform the method of claim 12.

15. A system comprising:
the transmitter of claim 11; and
a corresponding receiver configured to apply an inverse of the data interleaving map to de-interleave the channel groups into a received version of the plurality of error correction coding blocks, and use the error correction coding bits of the received version to recover the payload bits of the message.

16. The method of claim 8, wherein the plurality of channels are multiplexed over an optical fibre.

17. The method of claim 9, wherein each of the units of transmission hardware is arranged to transmit on a different respective transmission frequency or over a different respective physical transmission path.

18. The method of any of claim 1, wherein the interleaving map enables recovery of the message in event of any of a plurality of different channel failure scenarios, each with a different failed channel or combination of failed channels.

19. The method of claim 18, wherein at least one of the failure scenarios comprises more than one failed channel.

20. The transmitter of claim 11, wherein:
the transmission interface comprises a plurality of different units of transmission hardware, each configured to perform the transmission over a respective subset of the plurality of channels time-division multiplexed through the unit of transmission hardware, each of the subsets of channels comprising two or more of the plurality of channels;

the transmitter comprises multiplexing circuitry configured to direct each group of interleaved bits to a corresponding one of the units of transmission hardware for the respective channel over which the group is to be transmitted;

wherein the interleaver is configured to detect one of the units of transmission hardware having a failed channel or a channel with an error rate above a threshold, and in response to swap the respective subset of channels from said one of the units of transmission hardware to a back-up unit of transmission hardware, the back-up unit of transmission hardware being an additional unit off transmission hardware in addition to said plurality of units of transmission hardware.

\* \* \* \* \*